United States Patent [19]
Migeon et al.

[11] 3,978,391
[45] Aug. 31, 1976

[54] DIRECT CURRENT STABILIZING DEVICE
[75] Inventors: Rene Migeon, Boulogne; Yves Legrand, Bois d'Arcy, both of France
[73] Assignee: Compagnie Industrielle des Telecommunications Cit-Alcatel, Paris, France
[22] Filed: Jan. 22, 1975
[21] Appl. No.: 543,046

[30] Foreign Application Priority Data
Jan. 24, 1974 France............................ 74.02402

[52] U.S. Cl. .................... 323/4; 323/22 Z
[51] Int. Cl.² .......................................... G05F 1/58
[58] Field of Search ............... 307/296, 297; 323/1, 323/4, 9, 22 Z, 38

[56] References Cited
UNITED STATES PATENTS

| | | | |
|---|---|---|---|
| 2,978,630 | 4/1961 | de la Tour | 323/9 X |
| 3,246,233 | 4/1966 | Herz | 323/4 |
| 3,434,038 | 3/1969 | Vette | 323/4 |
| 3,652,922 | 3/1972 | Healey et al. | 323/4 |
| 3,881,150 | 4/1975 | Gay | 307/297 X |

*Primary Examiner*—A. D. Pellinen
*Attorney, Agent, or Firm*—Haseltine, Lake & Waters

[57] ABSTRACT

Current stabilizing device constituted by a two-terminal network in series with a load to be fed. The two-terminal network comprises, in series between its two poles a regulating transistor and a resistor, the regulating transistor being controlled by the current collector of another transistor whose base current is controlled by the difference between a stabilized voltage taken at the terminals of a voltage stabilizing diode through which a current which is itself stabilized flows and the voltage drop across the resistor; several two-terminal networks may be connected together in series. The device is particularly applicable to the stabilization of the remote feeding current for repeaters in telephone cables which are not accessible, for example, submarine telephone cables.

3 Claims, 3 Drawing Figures

DIRECT CURRENT STABILIZING DEVICE

The present invention relates to a device for stabilizing the current sent out by a direct current source for feeding a load resistor with a constant current, the electromotive force of the source and the load resistor being liable to undergo variations.

When it is required to stabilize the current sent out by a source supplying a voltage of several hundred volts, as is the case, for example with the remote feed current of repeaters in telecommunication systems on cables, it is necessary for the stabilization circuit to be able to absorb, during possible reductions of the load resistor, high voltages. It is an advantage to use, for that purpose, networks having a two-terminal structure and connected together in series so as to distribute these voltages.

A well-known constant current regulator is constituted by a two-terminal network including a resistor in series with a regulating transistor whose collector current is imposed by the connecting in parallel of a voltage stabilizing diode with the resistor and the base-emitter junction of the transistor in series.

Such a two-terminal network is very simple but is limited in the precision of regulation it can achieve.

U.S. Pat. No. 3,652,922 discloses another two-terminal structure, which is more complex, in which the variations in the current to be regulated are detected by means of a first transistor which compares the voltage drop across a first resistor with the voltage at the terminals of a voltage stabilizing diode through which flows a current stabilized by means of a second resistor connected in parallel with the base-emitter junction of that transistor and connected in series with the diode. The first transistor controls a second transistor through which a part of the current to be regulated flows and which has the function of draining more current in the case of an increase in the current to be regulated and less current in the contrary case, thus controlling a set of two other transistors which fulfill the function of a variable impedance in series with the first resistor and hence enables the variations in the current to be regulated to be compensated.

The present invention aims at providing a better stabilization of the current by simpler means. The invention has as its object a device for stabilizing the current supplied by a direct current source for feeding a load, constituted by a two-terminal network connected in series with the said load and comprising, in series between its two terminals, the emitter-collector path of a first transistor and a first resistor, as well as a branch line connected to the base of the said first transistor and to the terminal of the said two-terminal network which is connected to a terminal of the said first resistor, the said branch line comprising a first voltage stabilizing diode biased by a second resistor arranged between that first diode and the other terminal of the two-terminal network, comprising, moreover, between the said first transistor and the said first diode respectively, a second voltage stabilizing diode and the base-collector junction of a second transistor whose emitter-collector path is connected in parallel with a fraction of the said second resistor, so as to feed the said first diode with stabilized current and a third transistor whose collector is connected to the base of the second transistor and whose base-emitter junction is connected in parallel with the said first resistor and the said first diode in series.

Other characteristics and advantages of the present invention will become apparent from the description of one embodiment given hereinafter with reference to the accompanying drawing in which.

Figure 1:
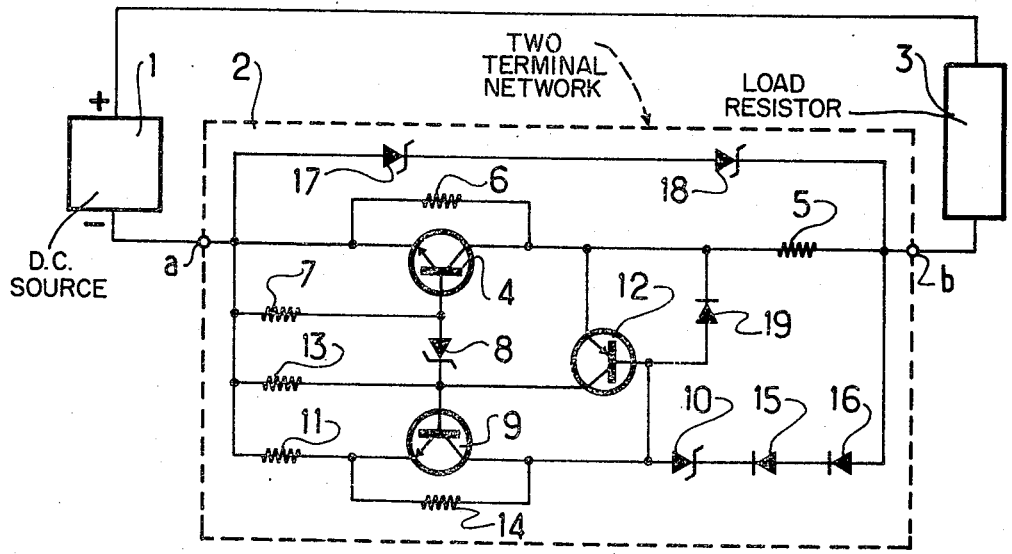
FIG. 1 shows a direct current source supplying a current stabilized by a device according to the invention.

The device in FIG. 1 comprises a direct current source 1, a two-terminal network 2 and a load resistor 3 in series with the two-terminal network 2.

The two-terminal network 2 comprises, in series between an input terminal $a$ connected to the negative terminal of the source 1 and an output terminal $b$ connected to the load resistance 3, the emitter-collector path of a first regulating transistor 4 of the NPN type and a resistor 5; a resistor 6 is connected in parallel with the emitter-collector path of the transistor 4 whose base is connected to the input terminal $a$ through a resistor 7. The two-terminal network 2 further comprises a branch line connected on one side to the base of the transistor 4 and on the other side to the output terminal $b$ and comprising, in series, a Zener diode 8, the base-collector junction of a second transistor 9 of NPN type and another Zener diode 10 which is, to great advantage, compensated for temperature by two diodes 15 and 16; the emitter of the transistor 9 is connected to the input terminal $a$ through a resistor 11. A third transistor 12 of the PNP type is connected through its collector to the base of the transistor 9, through its emitter and its base to the collectors of the transistors 4 and 9 respectively, the emitter-base junction of the transistor 12 being thus connected in parallel with the resistor 5 and the Zener diode 10 in series.

The two-terminal network 2 additionally comprises a load resistor 13 for the transistor 12, connected between the pole $a$ and the terminal common to the diode 8 and to the base of the transistor 9, and a resistor 14 in parallel with the emitter-collector path of the transistor 9 to enable the starting of the Zener diode 10.

Two Zener diodes 17 and 18 are, to great advantage, connected in series with another branch line connected to the two poles $a$ and $b$ of the two-terminal network 2. They prevent the voltage across the two-terminal network 2 from exceeding a certain value beyond which the transistor 4 which bears the greater part of that voltage between its emitter and its collector could be damaged. A diode 19 is connected between the base and the emitter of the transistor 12 to protect that transistor during the transient states.

Any variation of the current in the line, due to a change in the electromotive force of the source 1 or in the load resistor 3, causes a variation in the voltage drop across the resistor 5. A positive variation in the line current makes the base of the transistor 12 less negative in relation to its emitter; the transistor 12 becomes less conductive, this causing a decrease in the base current of the transistor 4, which, in turn, becomes less conductive. In a similar manner, a negative variation in the line current makes the transistor 4 more conductive.

The voltage drop across the resistor 11 is constant in a first approximation, that resistor being connected in parallel, with, in series, the base-emitter junctions of the transistors 4 and 9 and the Zener diode 8; that circuit thus constitutes a constant current generator which feeds the Zener diode 10; the voltage across the Zener diode 10 remains therefore particularly constant.

Figure 2:
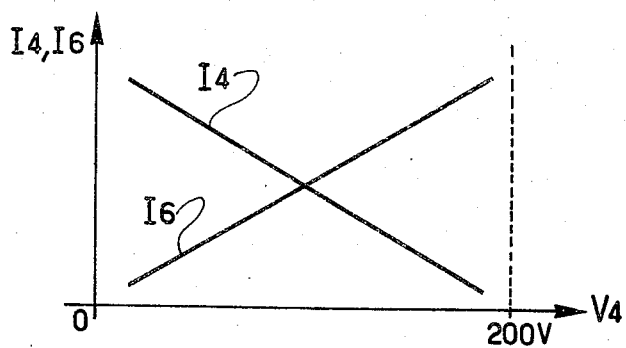
FIG. 2 shows a graph of the distribution of the current in two elements of the device according to FIG. 1.

FIG. 2 illustrates the function of the resistor 6. It shows, for a given value of the voltage supplied by the source 1, for example 200 volts, the distribution of the current between the resistor 6, current 16 and the transistor 4, current 14, as a function of the value of the collector-emitter voltage V4 of the transistor 4, the value of that voltage itself depending on the value of the load resistance 3. In the case of a low load resistance, the voltage V4 is high but a slight portion only of the line current flows through the transistor 4, the greater part of that current flowing through the resistor 6; in the case of a high load resistor, the greater part of the line current flows through the transistor 4, but the voltage V4 is low. The total power dissipated in the transistor 4 is thus limited.

When the rated voltage supplied by the source 1 is too high for only one two-terminal network to bear it almost entirely at its terminals (very low load resistor), several two-terminal networks according to the invention may be connected together in series.

Figure 3:
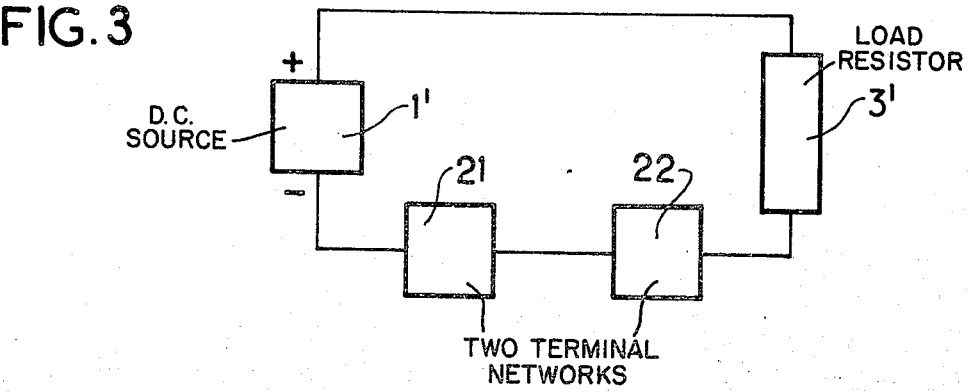
FIG. 3 shows a direct current source supplying a current stabilized by a circuit consisting of two devices according to the invention connected together in series.

FIG. 3 shows a circuit according to the invention constituted by two two-terminal networks 21 and 22 similar to the two-terminal networks 2 in FIG. 1 and connected in series between a direct current source 1' and a load resistor 3'.

The present invention has been described with reference to one embodiment. It is obvious that, without going beyond the scope of that invention, changes may be made thereto and/or certain means may be replaced by other technically equivalent means. More particularly, the two-terminal network according to the invention could be placed between the positive terminal of the source and the load resistor, the transistors of NPN type 4, 9) of the device in FIG. 1 then becoming of the PNP type and vice-versa; the emitter of the regulating transistor 4 could be connected to the load resistor, the resistor 5 connected in series with the emitter-collector path of that transistor being connected to the source. It should be observed, moreover, that when several two-terminal networks according to the invention are connected together in series, some of them may be arranged between the positive terminal of the source and the load resistor and others between the negative terminal of the source and the load resistor.

What is claimed is:

1. A device for the stabilization of the current supplied by a direct current source for feeding a load, constituted by a two-terminal network connected in series with the said load and comprising: a first transistor and a first resistor, said transistor having an emitter-collector path connected in series with said first resistor, a first terminal of said network being connected to said emitter-collector path, a second terminal of said network being connected to said first resistor, a branch line connected to the base of said first transistor and to said second terminal of said network, a first voltage stabilizing diode in said branch line, a resistor network biassing said first voltage stabilizing diode and arranged between said first diode and said first terminal of said network, a second voltage stabilizing diode in said branch line connected to the base of said first transistor, a second transistor in said branch line having a base connected to said second diode and a collector connected to said first diode, said second transistor having an emitter-collector path connect in parallel with a portion of said resistor network to feed said first diode with stabilized current, and a third transistor having a collector connected to the base of the second transistor and a base-emitter circuit connected in parallel with said first resistor and said first diode.

2. A device according to claim 1 further comprising a resistor connected in parallel with the emitter-collector path of the said first transistor.

3. A device for the stabilization of current supplied by a direct current source for feeding a load, including at least two two-terminal networks connected in series with said load, each network comprising:

a first transistor and a first resistor, said transistor having an emitter-collector path connected in series with said first resistor, a first terminal of said network being connected to said emitter-collector path, a second terminal of said network being connected to said first resistor, a branch line connected to the base of said first transistor and to said second terminal of said network, a first voltage stabilizing diode in said branch line, a resistor network biassing said first voltage stabilizing diode and arranged between said first diode and said first terminal of said network, a second voltage stabilizing diode in said branch line connected to the base of said first transistor, a second transistor in said branch line having a base connected to said second diode and a collector connected to said first diode, said second transistor having an emitter-collector path connected in parallel with a portion of said resistor network to feed said first diode with stabilized current, and a third transistor having a collector connected to the base of the second transistor and a base-emitter circuit connected in parallel with said first resistor and said first diode.

* * * * *